Nov. 6, 1962
F. CHRISTENSEN
3,062,265
PIPE CRIMPING DEVICE
Filed Nov. 12, 1959
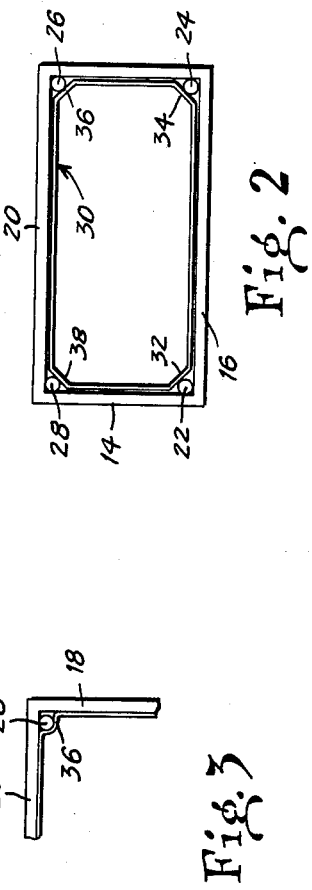
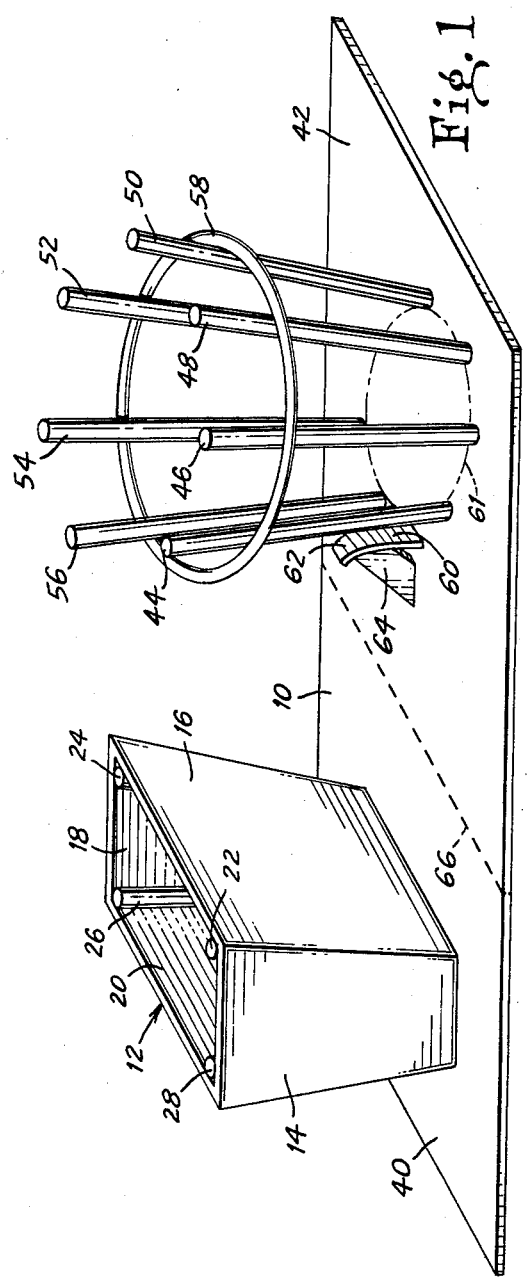
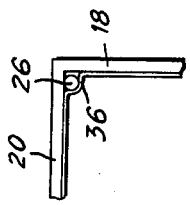
INVENTOR
Ferdinand Christensen,
BY Diggins + Le Blanc
ATTORNEYS United States Patent Office 3,062,265
Patented Nov. 6, 1962

3,062,265
PIPE CRIMPING DEVICE
Ferdinand Christensen, 1116 East Ave., Holdrege, Nebr.
Filed Nov. 12, 1959, Ser. No. 852,416
6 Claims. (Cl. 153—32)

This invention relates to a pipe crimping device and more particularly relates to a pipe crimping device for pipe having either a rectangular or circular cross section with the device being held between the feet of the operator.

During the installation of either round or rectangular rain gutter or down spouts it is necessary quite frequently to cut a section of pipe before fitting the pieces together. The cut off end must then be crimped so as to fit into the other components of the assembly. One major difficulty with prior devices used to crimp pipe such as down spout and the like is that both the crimping device and the pipe had to be held in some manner by the operator. Difficulty has been experienced not only in forcing the pipe into the device to obtain a uniform and a desired amount of crimping but also in removing the crimped pipe from the crimping device. In some instances the operator has had to hold the crimping device with one hand and the pipe with the other to effect the removal of the pipe from the crimping device. Also the operator has had to do a considerable amount of bending and/or stooping in the crimping operation. The resulting crimping has not been uniform and the operation is time consuming.

The present invention effectively overcomes these problems by mounting a pair of crimping tools on a common base plate which may be held between the feet of the operator during the crimping operation. One of the tools mounted on the base plate is adapted to receive pipe of rectangular cross section whereas the other tool mounted on the base plate is intended to receive a corrugated pipe having a circular cross section.

In the tool adapted to be used with pipe having a rectangular cross section a series of rods are provided within a tapered rectangular tube and welded in the corners thereof so as to engage and fold in the flat 45° angle bend with which each corner of standard factory made down spouting is provided to insure that the pipe will be able to shrink or be crimped to the desired smaller size. On the other hand, where pipe having a circular cross section is being crimped, a special pipe seam compression plate is provided mounted vertically on the base plate and provided with an outwardly flared upper portion to insure the proper positioning and shrinkage of dimension for the circular pipe. The tool used in connection with pipe having a circular cross section is also novel in that a series of rods or pipes are provided which are attached to the base plate at one end substantially in a circular configuration with the pipes extending outwardly from this circle with an equal slope. A ring member lying in a plane parallel to the base plate is welded to the exterior portions of the rods to restrain the rods from moving outwardly when it is engaged by a pipe to be crimped.

Since the device is conveniently held between the feet of the operator, both hands of the operator are free to position and insert the pipe with the proper amount of pressure and to withdraw the crimped pipe smoothly and evenly from the crimping tools. This enables the operator to work at an extremely rapid rate substantially from a standing position and it has been found that up to 90% of the time normally required to do the crimping operation has been eliminated with the crimping tools of the present invention. The crimping that is obtained is extremely uniform and can conveniently be accomplished by a helper as well as a journeyman.

Accordingly, it is a primary object of the present invention to provide a pipe crimping device that will greatly expedite the manner in which pipe may be crimped on the job.

It is another object of the present invention to provide a pipe crimping device which insures uniformity of crimping regardless of who performs the crimping operation.

It is still another object of the present invention to provide a pipe crimping device suitable for use by an unskilled operator from a standing position.

It is a further object of the present invention to provide a novel pipe crimping device which may be placed on the ground and held between the operator's feet.

It is still another object of the present invention to provide a pipe crimping device suitable for use with pipe having either a rectangular or circular cross section.

These and further objects and advantages of the present invention shall become more apparent upon reference to the following specification and claims and appended drawing wherein:

FIGURE 1 is a perspective view of the pipe crimping device of the present invention;

FIGURE 2 is a horizontal view illustrating a rectangular pipe about to be crimped; and FIGURE 3 is a fragmentary horizontal view showing the deformation of one corner of the pipe in FIGURE 2 as it is crimped.

Referring now to FIGURE 1 of the drawing, there is shown a base plate indicated at 10. A first pipe crimping tool consisting of a tapered hollow rectangular section is indicated generally at 12 having sides 14, 16, 18, and 20. The rectangular section 12 is preferably attached to the base plate 10 by welding. A series of rods 22, 24, 26 and 28 are positioned within the section and preferably welded to the corners thereof.

Referring to FIGURE 2, there is shown a pipe indicated generally at 30 of rectangular cross section. Pipe 30 has flat 45° angle bends or corners 32, 34, 36 and 38. The base plate 10 is shown to be provided with end extensions 40 and 42 which extend longitudinally beyond the tool 12 and a second tool spaced longitudinally from the tool 12 and adapted to be used with pipe having a circular corrugated cross section.

Referring to the right hand of FIGURE 1, there is shown a second pipe crimping tool which consists of a series of rods 44, 46, 48, 50, 52, 54 and 56. The drawing depicts rods 44—56 as being hollow but it is to be understood that solid rods could also be used. The rods 44—56 are attached by welding at one end to base plate 10 in such a manner that the rods lie substantially in a circle in the plane of the base plate 10. The rods extend outwardly from this circle formed at the base plate with an equal slope so as to define a conical surface which flares upwardly and outwardly from the base plate. A retaining ring 58 lies in a plane parallel to the base plate and engages each of the rods 44—56 by being welded thereto and prevents the rods from moving outwardly when engaged by the pipe that is to be crimped.

A pipe seam compression plate 60 is mounted vertically with respect to the base plate 10 to which it is welded and is positioned so as to be tangential with the circle which passes through the innermost edges of the lower ends of rods 44—56 attached to base plate 10. This circle is indicated by a dashed line at 61. The pipe seam compression plate 60 is provided with an outwardly bent upper portion 62 to contact the seam of the pipe to be crimped and effect a gradual reduction in diameter. A brace 64 is welded to the base plate 10 and to the pipe seam compression plate 60 to form a rigid structure and prevent outward movement of the pipe seam compression plate 60.

It is desirable to have both the rectangular and circular crimping tools mounted on the same base plate because greater stability is thereby afforded. Also it will be appreciated that this provides a maximum utilization of material especially with respect to the base plate because of the fact that room must be provided on the base plate to allow the operator to place his feet. As has been pointed out it is in this manner that the crimping device may be securely held by the operator. It is, nevertheless, possible to use a single tool on one base plate. For purposes of illustration, the base plate 10 could be cut as along the dashed line 66 to provide a base plate in which a single tool is mounted. From a sales standpoint, it is desirable to have an article of manufacture which will handle pipes whose cross sections may be either rectangular or circular.

While the operation of the crimping tool of the present invention will be readily understood from the foregoing description, a further illustration of its use may be had by reference to FIGURES 2 and 3. In FIGURE 2 a pipe 30 is about to be inserted into tool 12 and the corners of the pipe are about to be engaged by the rods 22, 24, 26 and 28. FIGURE 3 shows how, with pressure applied, one of the flat corners 36 of the pipe 30 is deformed by rod 26 to take up extra material and permit the pipe to be crimped or shrunk to its desired smaller size. In effecting this, the operator stands with his feet on the extensions 40 and 42 and simply inserts the pipe with the required hand pressure. Usually this is performed while the operator is in a standing position. In utilizing the crimping tool in connection with pipe having a circular cross section, the seam of the pipe to be crimped is aligned with the pipe seam compression plate 60 and inserted within the conical surface defined by the inner surfaces of the rods 44—56, and pressed downwardly with a sufficient force to effect the crimping operation. It should be noted that in the use of both of the tools, the separation of the pipe from the tools may very conveniently be effected by virtue of the fact that the operator is standing on the extensions 40 and 42 so that the pipe may be removed smoothly and evenly from the tools.

By way of a specific embodiment of the crimping tools of the present invention, sizes will be given for a tool adapted to receive both a standard size rectangular pipe whose maximum length of a side is three inches and a three inch corrugated round down spout. The base plate for such a tool is preferably made of steel plate having a length of 11¾ inches, a width of 5 inches and a thickness of 3/16 of an inch. The sides 14 and 18 of the tool 12 are made of ⅛ inch steel plates and are 1⅝ inches at the point of attachment to base plate 10 and 2¾ inches at their uppermost surface. The side plates 16 and 20 are also of ⅛ inch steel plate and are 2⅝ inches long at the attachment to the base plate 10 and 3¾ inches long at their upper surface. All side plates 14, 16, 18 and 20 extend 4⅝ inches from the base plate. Rods 22—28 are made of 5/16 inch steel rods welded to the corners of the tapered section 12.

For the tool to be used with three inch corrugated round down spout, the pipe seam compression plate 60 is preferably 2¾ inches high and bent outwardly at 62 to receive the seam of the tube. The plate is made from 3/16 of an inch by ¾ inch strap iron. The rods 44—56 are made of ⅜ of an inch iron gas pipe and are 4¾ inches long. The retaining ring 58 has an inner diameter of 4¼ inches and is made from 5/16 of an inch steel rod. The circle 61 passing through the innermost portions of the rods 44—56 at their points of attachment to the base plate 10 has a diameter of 2 inches.

It will be appreciated that the crimping device of the present invention greatly expedites the manner in which piping may be crimped on the job. Both uniformity of the crimping operation and use by unskilled labor is possible in the practice of the present invention. The utilization of a base plate is an important adjunct of the invention because it greatly facilitates the crimping operation both in the insertion of the pipe and in the removal thereof. Finally, it is an important advantage to be able to use a crimping device with pipe having both rectangular and circular cross sections.

While a tool for uncorrugated rectangular pipe and one for corrugated circular pipe have been shown, it is apparent that other tools may be similarly formed or combinations utilized. It is within the scope of the present invention to provide a tool for corrugated rectangular pipe wherein a tool such as tool 12 is provided with additional rods spaced along the sides 14, 16, 18 and 20 much in the manner of rods 44—56. As with the construction shown, the rods must be spaced to engage the corrugations formed in the pipe or down spout.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pipe crimping device comprising a base plate, a hollow tubular section supported by said base plate, said tubular section having an outwardly flared portion extending away from said base plate, said hollow tubular section including a rigid portion extending completely around said section for restraining said section from moving outwardly when engaged by a pipe to be crimped, said base plate extending longitudinally on two opposite sides of said tubular section to permit an operator to stand on said base plate for holding said crimping device.

2. A pipe crimping device as set out in claim 1 wherein said tubular section possesses a rectangular cross section.

3. A pipe crimping device as set out in claim 2 including rods welded to the corners of said tubular section for inwardly compressing the corners of a pipe to be crimped.

4. A pipe crimping device as set out in claim 1 wherein said tubular section defines a conical surface which flares upwardly and outwardly from said base plate.

5. A pipe crimping device as set out in claim 4 wherein said tubular section defining a conical surface consists of a plurality of rods attached at one end to said base plate, said one end of said rods lying substantially in a circle, and said means associated with said tubular section to restrain said section from moving outwardly when engaged by a pipe to be crimped is a ring member welded to said rods.

6. A pipe crimping device as set out in claim 5 including a plate mounted vertically on said base plate substantially tangential to the circle containing the innermost surfaces of said rods for engaging the seam of a pipe to be crimped.

References Cited in the file of this patent

UNITED STATES PATENTS

| | | |
|---|---|---|
| 579,214 | Adams | Mar. 23, 1897 |
| 591,163 | Gill | Oct. 5, 1897 |
| 1,513,565 | Somersall | Oct. 28, 1924 |
| 2,531,489 | Wood | Nov. 28, 1950 |